(12) United States Patent
Wallace et al.

(10) Patent No.: US 8,176,425 B2
(45) Date of Patent: May 8, 2012

(54) ANIMATED SCREEN OBJECT FOR ANNOTATION AND SELECTION OF VIDEO SEQUENCES

(75) Inventors: Michael W. Wallace, Vancouver, WA (US); Troy Steven Acott, Beaverton, OR (US); Larry Alan Westerman, Portland, OR (US); Carl Johnson, Portland, OR (US)

(73) Assignee: Ensequence, Inc., Portland, OR (US)

( * ) Notice: Subject to any disclaimer, the term of this patent is extended or adjusted under 35 U.S.C. 154(b) by 3218 days.

(21) Appl. No.: 10/066,144

(22) Filed: Jan. 31, 2002

(65) Prior Publication Data

US 2002/0105535 A1 Aug. 8, 2002

Related U.S. Application Data

(60) Provisional application No. 60/266,012, filed on Feb. 2, 2001.

(51) Int. Cl.
*G06F 3/048* (2006.01)

(52) U.S. Cl. ........ 715/721; 715/720; 715/722; 715/726; 715/712

(58) Field of Classification Search .................. 345/720, 345/723, 721, 724, 725, 726; 725/37
See application file for complete search history.

(56) References Cited

U.S. PATENT DOCUMENTS

| | | | |
|---|---|---|---|
| 5,461,711 A | 10/1995 | Wang et al. | |
| 5,515,486 A | 5/1996 | Amro et al. | |
| 5,521,841 A * | 5/1996 | Arman et al. ................. | 345/723 |
| 5,537,528 A | 7/1996 | Takahashi et al. | |
| 5,574,845 A | 11/1996 | Benson et al. | |
| 5,677,708 A | 10/1997 | Matthews, III et al. | |
| 5,767,835 A | 6/1998 | Obbink et al. | |
| 5,828,370 A | 10/1998 | Moeller et al. | |
| 5,880,729 A | 3/1999 | Johnston, Jr. et al. | |
| 5,940,076 A | 8/1999 | Sommers et al. | |
| 6,005,562 A * | 12/1999 | Shiga et al. ................... | 345/721 |
| 6,133,920 A | 10/2000 | deCarmo et al. | |

OTHER PUBLICATIONS

Li, Francis C. et al., "Browsing Digital Video". CHI 2000 Apr. 1-6, 2000.*
Hanjalic, et al., Automation of Systems Enabling Search on Stored Video Data, Proceedings of the Spie, Spie, Bellingham, VA, US, Feb. 13, 1997, pp. 427-438, vol. 3022, XP000742399 ISSN: 0277-786X.

* cited by examiner

*Primary Examiner* — Namitha Pillai
(74) *Attorney, Agent, or Firm* — Marger Johnson & McCollom, P.C.

(57) ABSTRACT

A simple display of items from a list, which changes in synchrony with the corresponding video display, and permits simple navigation under user control. The display includes three control objects positioned below a video frame window on a display screen. A middle displayed object is located in a focus position and corresponds to the video segment currently being played in the video window. When play of the segment is complete, the object located to the right of the focus position moves and displaces the middle displayed object, most recently displayed within the focus position, to indicate a forward progression within the viewed video sequence.

23 Claims, 2 Drawing Sheets

ANIMATED SCREEN OBJECT FOR ANNOTATION AND SELECTION OF VIDEO SEQUENCES

CROSS-REFERENCES TO RELATED APPLICATIONS

This application claims the benefit from U.S. Provisional Patent Application No. 60/266,012 filed Feb. 2, 2001 whose contents are incorporated herein for all purposes.

BACKGROUND OF THE INVENTION

1. Field of the Invention

The present invention relates to computer graphics processing, and more specifically to the annotation and manipulation of video objects by means of a graphical user interface object comprising multiple buttons.

2. Description of the Prior Art

Graphical user interfaces exist which provide elaborate and flexible manipulation of objects and actions on computer screens. Such interfaces have been developed to accommodate the power and performance available in contemporary processor chips, and to permit the incorporation of direct manipulation interface hardware such as computer mice, trackballs, joysticks and the like.

One common function required in computer systems is the viewing and selection of items from a list. The prior art contains a number of examples of user interface schemes which work well within the conventional computer environment for this task. The most comprehensive of these from the perspective of the current disclosure is U.S. Pat. No. 5,677,708, which is assigned to Microsoft and is titled "System for Displaying a List on a Display Screen." The '708 patent discloses the display, on a screen, of a list of user-selectable items, at least three in number, where the items on the edge of the screen are only partially displayed. The user can make a selection from one of the items on the screen, or scroll the list to move additional items on or off the screen. The combination of these actions results in a selection, which results in some action by the underlying user interface software.

The patent literature contains other examples of movable or animated button selections. For example, U.S. Pat. No. 5,515,486 which is assigned to IBM and is titled "Method, Apparatus and Memory for Directing a Computer System to Display a Multi-Axis Rotatable, Polyhedral-Shape Panel Container Having Front Panels for Displaying Objects" describes the graphical presentation of an apparently three-dimensional container, the faces of which represent information or choices to the user. U.S. Pat. No. 5,940,076, which is assigned to Motorola and is titled "Graphical User Interface for an Electronic Device and Method Therefor," describes a circular display of choices or features.

The need for a complex and highly featured user interface has moved beyond the computer environment, however. Digital technology is moving into the field of home entertainment. The new digital television standard is encouraging the integration of computer technology into home entertainment appliances. One example of this convergence is the digital set top box, which functions to receive digital signals from cable or satellite broadcast sources, and to demodulate, decompress, and convert these signals into analog signals viewable on conventional television sets. The new generation of these boxes will incorporate disk drives, making them more like computers in their ability to store and reproduce digital content. Similarly, computers are being used as home entertainment vehicles, incorporating DVD drives and VCR-like functionality.

Consumer television systems present more of a challenge for the user interface designer, since the television or the set top box typically has a lower level of computer performance, and a paucity of direct manipulation options. The typical TV remote control utilizes only a rocker switch input mechanism or opposing button switches for controlling volume or selecting channels, rather than the more flexible mouse or track ball interface.

Another aspect of digital technology that is entering the home entertainment market is the provision of enhanced or interactive television content. Viewers are no longer limited to simply viewing a program, nor to the simple VCR-like choices of fast forward, rewind, pause and continue. The new interactive television paradigm promises to provide the user with a richer, more flexible and engaging experience, through the incorporation of selective navigation through a multiplicity of linear and non-linear paths displaying segments of video, still images, and other types of entertainment and information content. The selection of paths through video will no longer follow the passive start-and-watch model, but will permit or require active choices by the viewer. However, the typical expected user of interactive television cannot be expected to learn and master a complex interface paradigm. Therefore, the interaction control must be simple, self-explanatory, intuitive, and direct. Furthermore, the interface must provide a means of assisting the user in understanding the significance of the content being viewed, a means of labeling the various choices available to the user, assistance in remembering the path taken through the content, and a mechanism for visually depicting linear time flow and allowing the opportunity to alter the speed and direction of that flow.

None of the existing interface methods combines the annotated display of multiple relevant choices for time-varying content, with a simple means of navigating the time series. Accordingly, the need remains for an improved system for user navigation through video content and the like.

SUMMARY OF THE INVENTION

The current invention combines a simple display of items from a list, which changes in synchrony with the corresponding video display, and permits simple navigation under user control.

DETAILED DESCRIPTION

The current invention is adapted for use with video display systems, such as those known in the art, that include various video segments that are arranged to play in some linear (or non-linear) progression to form a video sequence. An example of such a known video display system is a DVD, or digital video disc, in which a user may selectively skip to a desired segment of the video movie using the graphic user interface, programmed in software on the disc and operable on the DVD player to allow user navigation between the segments. The segments are delineated by the producer of the DVD, where each segment may include one or more scenes. A typical DVD movie may have as many as forty designated segments that the user may select and play.

The current invention is also operable on other video systems such as hard-drive based systems (such as those found on some modern set-top boxes) and video-on-demand systems where the video content is continuously being downloaded over a network for play in response to user interaction with the network.

Figure 1:
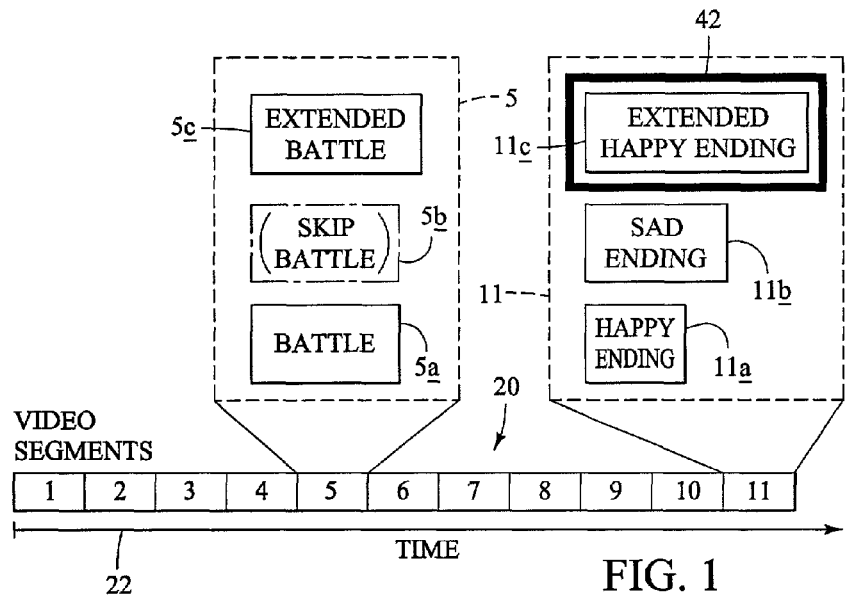
FIG. 1 is a schematic diagram of video segments to be displayed graphed against a timeline.

FIG. 1 illustrates the organization of a video sequence at 20, comprised of a plurality of video segments on timeline 22, here labeled from segments 1 through 11. In a typical video sequence, say of a movie, playback over the video system occurs in a linear fashion by playing video segment 1 (which corresponds to the first scene of the movie) to completion and then immediately playing video segment 2 and so forth until the end of the movie is reached after completion of video segment 11.

While playback of the video sequences 1-11 in order typically occurs by default and without further interaction by the user with the video display system, it may be desirable to provide a video sequence having many possible branches and/or endings. In FIG. 1, for example, video segment 5 has three different possibilities 5a, 5b, and 5c. Segment 5a may be, for instance, a video segment showing a great battle in the middle of the movie video sequence 20. Segment 5b may be, for instance, a null video segment of virtually no time that essentially skips the battle scene and instead bridges segment 4 with segment 6. This may be useful if, for instance, one of the viewers is a young child who is sensitive to violence. Finally, segment 5c may show an extended and unedited version of video segment 5a that may have initially been cut from the movie released in the theaters.

FIG. 1 also shows segment 11 with three possible endings 11a, 11b, and 11c to the video sequence 20. As will be appreciated below, only one of these endings will be selected by user interaction with the video display system using the selection and annotation scheme disclosed in the present invention and discussed in more detail further below.

Figure 2:
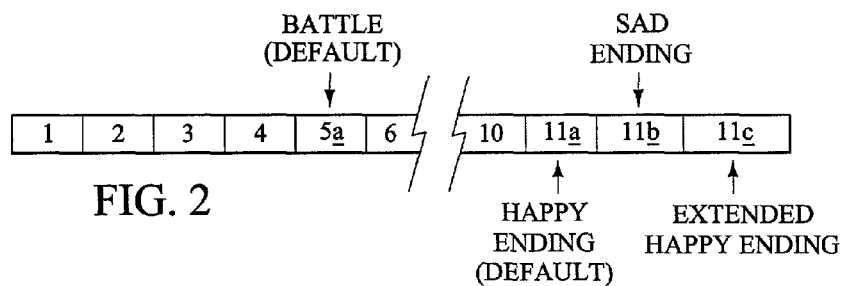
FIG. 2 is a schematic diagram of video segments physically arrayed on a storage device.

FIG. 2 illustrates the physical arrangement of data for the video segments on a storage medium such as a digital video disc (DVD) or hard disk drive. As it is desired for the read head of the storage medium to traverse the least distance, video segments are typically arranged sequentially in the expected order in which they are to be played. In the present example, the video sequence (movie) formed by the default organization of the video segments—that is, without further user interaction as described further below—results in segment 5a (the battle scene) being played immediately after segment 4 and before segment 6. Similarly, the default ending 11a to the video sequence is stored immediately after the data for segment 10 since the expectation is that a viewer of the video segment would chose to view the default ending. The other endings, segments 11b and 11c, are stored after default ending segment 11a.

Figure 3:
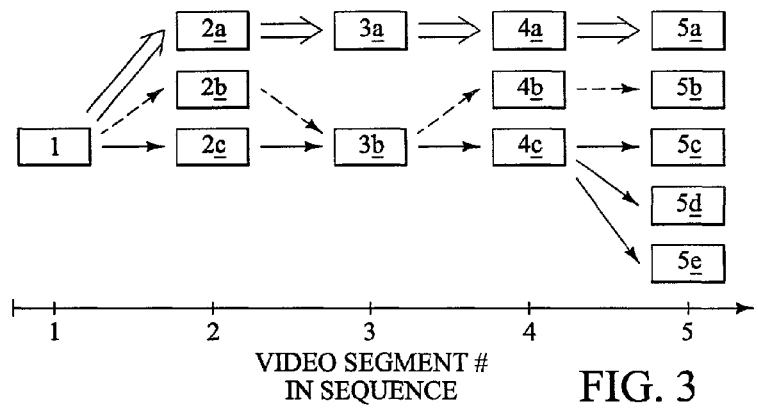
FIG. 3 is a schematic flow diagram showing the several branching pathways obtained by selection of various video segments using the teachings of the invention.

FIG. 3 illustrates the arrangement of video segments into one of a plurality of possible video sequences, where the sequence shown is produced by combining a total of five video segments. The sequence branching follows a series of predefined "rules" that regulate the flow of the sequence from beginning to end. For instance, in the example shown, all possible video sequences begin with a display of video segment 1. From there, the sequence has three possible branch paths: to segment 2a along the double-lined arrow, to segment 2b along dashed arrow, and to segment 2c along single-lined arrow. The simplified user interface for selecting 2a, 2b, or 2c is explained further below. If segment 2a is selected (or if 2a is the default segment absent further user interaction), then segment 2a is displayed on the video display system—such as an attached television or computer monitor and the like—and the sequence proceeds to segments 3a, 4a and then 5a before ending. Note that the rules associated with selection of segment 2a require that no further branching exists once the path designated by the double-lined arrows is chosen.

If segment 2b is selected, as by using the user interface of the present invention, then play proceeds to 2b and thence to segment 3b. If segment 2c is selected, then play proceeds to 2c and thence to segment 3b. The rules for selection of segment 2b or 2c disallow segment 3a from appearing in the rightmost position on the display screen as a possible branching option. At 3b, the user of the video display system is again given a choice of branching paths.

The system is programmed to default to one of the paths in the absence of further user interaction with the video display system. In one example, a user who proceeded down the viewing path denoted by the dashed line would default to segment 4b after viewing segment 3b because, for instance, scenes within video segment 4b may better correlate with scenes shown in earlier-viewed segment 2b. A user who proceeded down the viewing path denoted by the single-lined arrow would default to segment 4c for similar reasons. It is also possible that both paths could default to the same segment (e.g. segment 4b). Finally, segment 4c branches into three different paths—segment 5c, segment 5d, and segment 5e—with one of the segments being set to default and the remaining ones selected under control of user input.

The current invention is intended for the annotation and interactive display of video segments. Typically such segments are viewed as they are played, and the annotated labels are displayed in sequence, in synchrony with the video display. However, the invention may also be used in a mode where the video is not being played (having been paused, for example, or prior to initiating playback). In this case, the displayed images will correspond to still images taken from the video segments corresponding to the annotations.

Figure 4:
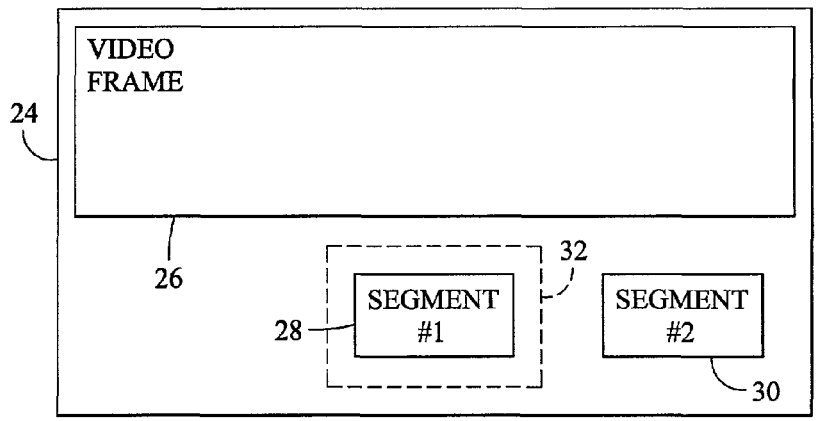
FIG. 4 is a layout for video display implemented according to a preferred embodiment of the invention.

To display the contents of a list of annotations, the current invention uses at most three buttons or button-sets (referred to herein as "control objects") displayed on a video display screen 24 as shown in FIG. 4. The video screen has displayed thereon a video segment within a video frame 26 and, in a preferred embodiment, a plurality of control objects 28, 30 located in non-overlapping relation to the video frame 26 in which the video segment is displayed. The center object 28 is located within a centrally located focus position 32, designated by dashed line, which represents the current focus of the list and corresponds to the video selected by the user and/or displayed on the screen.

Several aspects of this diagram are remarkable. First, at most three buttons or button sets are displayed on the screen, each of them shown in its entirety. Only in special cases, such as that in FIG. 4, are less than three buttons shown: For the first segment of video, the 'previous' (left) button is not shown. Similarly, for the last segment of video, the 'next' (right) button is not shown. In the rare case that the video contains only one segment, only one button would be shown.

Second, the center button, which represents the video currently showing, or last shown prior to pause, is highlighted to indicate its selection. The selected button is always displayed in the center position. If the user chooses, in the display shown in FIG. 5, to select either the 'previous' (in this case, segment 1) or 'next' selection (here, segment 3), and does so by means of selection arrows or a rocker switch on a typical remote control, the focus shifts to the corresponding button, and the button itself moves to the center position. This movement may be accomplished by animating the movement, using a multiplicity of intermediate positions, or by simply repainting the labels of the buttons, replacing the label of the center button with the label from the selected button, and updating the corresponding labels for the 'previous' and 'next' buttons.

Figure 5:
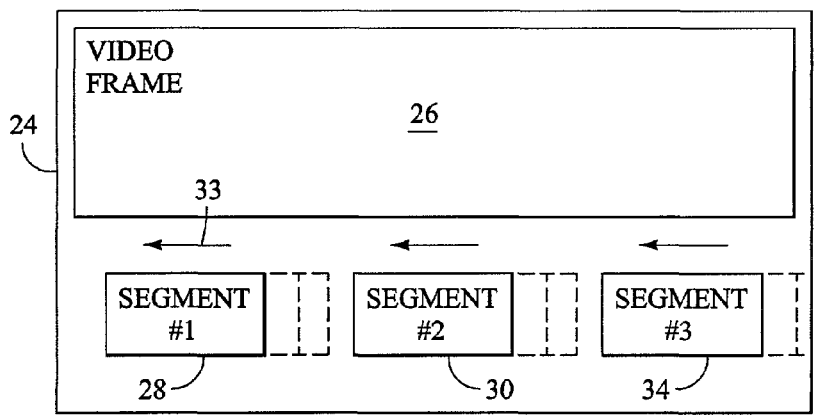
FIG. 5 is the button configuration of FIG. 4 during a transition sequence.

FIG. 5 shows how a transition state may appear following the selection of the 'next' button when the button movement is animated. The selection and annotation method practiced according to a preferred embodiment of the invention displays a first control object 28, associated with a displayed first video segment 1 of the video sequence, on the display screen 24 in the focus position 32 simultaneous with the display of the first video segment 1 on the display screen within the video frame 26. A second control object 30, associated with a second video segment, is displayed on the display screen 24 adjacent to the focus position. Here, since the video segment 2 associated with second control object 30 would normally be shown within a video sequence at a later time than the video segment 1 associated with first control object 28, the second object 30 is shown to the right of object 28. It is understood that the invention is not limited to the arrangement of the objects and that any arrangement of objects can be implemented so long as the arrangement is temporally consistent. For instance, English language speakers read from left-to-left and therefore it is more appropriate to have the flow of time in the same direction. Speakers of Hebrew (right-to-left) and of Japanese (up-to-down) may necessitate a different organization to make it more intuitive to the natural directional flow of the language.

During a transition between video segments, the second control object 30 moves to the focus position 32 (centered and directly below video frame 26), and the first control object 28 moves out of the focus position toward the left in the direction of arrow 33, in substantial synchronicity with a transition between the display of the first video segment 1 and the second video segment 2 on the display screen 24. Movement is denoted by the repeating dashed portions to the right of each object. Following the transition, the right button (control object 34) appears with the label appropriate for associated video segment 3.

The first, second, and third objects (28, 30, and 34, respectively) correspond to current, future and past segments respectfully within the default video sequence. It is significant to note that the forward transition (that is, to segments later in time) can be done automatically as the video sequence is played. These transitions, as well as backward transitions, may also be made under user control. Transitions can occur when video is paused, that is, when a still image is displayed.

The focus position 32 is interposed between the now-moved first control button 28 and the third control button 34. Once video segment 2 has completed play, the following sequence of events occur: associated control object 30 is moved to the left out of the focus position 32, leftmost first object 28 is moved off the display screen 24, third control object 34 moves into the focus position, and a fourth object (not shown in FIG. 5) is simultaneously moved into the position previously vacated by the third control object 24. The object movement occurs in substantial synchronicity with the start of the next video segment 3 and the end object position results in the focus position being interposed between the control object 30 and the fourth (not shown) control object.

The control objects are signified by annotations, such as still images and/or descriptive text, corresponding to the content of the video segments associated with the control objects. The object buttons may be labeled in a variety of ways, including images, icons, animations, keywords, game clues, trivia answers. Such labels need not specifically define or describe the corresponding video segment, but will be related to it in some way. FIG. 1 includes examples of such annotations, where the object associated with segment 5a is annotated "Battle", 5b as "Skip Battle", 5c as "Extended Battle", 11a as "Happy Ending", 11b as "Sad Ending", and 11c as "Extended Happy Ending".

Figure 6:
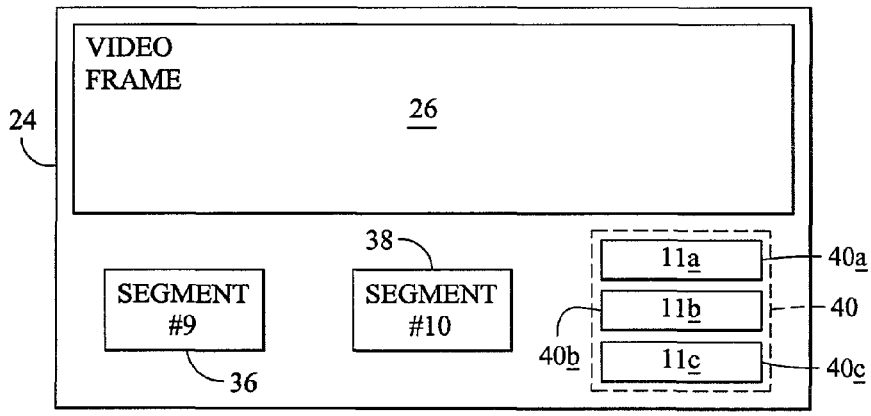
FIG. 6 is a screen view with multiple future choices implemented according to an alternate embodiment of the invention.

Turning next to FIG. 6, shown is the video display 24 (television, computer monitor, cell phone, etc.) having displayed thereon control objects 36, 38 and 40 associated with video segments 9, 10 and 11 respectively. Control object 40 includes a plurality of subobjects (40a, 40b, and 40c) corresponding to video segments 11a, 11b and 11c, each of which provide a selectable branching pathway from the previous video segment, designated by control object 38. Objects 40a, 40b and 40c correspond to video segments of alternate endings to the video sequence/movie. In the absence of input from a user of the video display system and at the end of video segment 10, a preset one of the three subobjects (e.g. object 40b) moves to the focus position 32 and the corresponding video segment to that object (segment 11b) plays within the video frame 26.

User selection of one subobjects (or of another of the objects) occurs by scrolling among the plurality of control objects based on input from a user of the video display system, as by using the rocker switch on a remote control. The designated object is selected as by depressing an 'enter' or some similar function key on the remote control and the selection of one of the control objects (or subobjects) is accepted by the video display system. The selected object is then moved to the focus position and the associated video segment is played within the video frame window 26. Scrolling is accomplished using visual cues such as a focus frame 42, shown highlighting a particular control object 11c in FIG. 1, which is moveable between the plurality of objects to provide a visual indication of user control of the selected control object.

The selection process may also be accomplished by means of a screen object, such as a pointer or indicator, which is manipulated by any standard user interface pointer device like a mouse or trackball; by means of designated keys, such as the '4' and '6' keys on a telephone touch pad; or directly by means of a touch-sensitive display screen.

As shown in FIG. 6, the number of subobject buttons may be increased, with two or more buttons on each side of the center (focus) button. Navigation would then be a two-dimensional process, with various options available for past (left) and/or future (right) movement. As described above, segment 11b would be the segment displayed if no user intervention occurred, while segments 11a and 11c would be optional choices available to the user. In this scenario, multiple branching paths through the video segments would be possible. Navigation in such an interface might require a joystick or other control capable of selecting from multiple directions, rather than a simple right arrow or rocker switch control, or could be accomplished with the use of rapid multiple button presses, or combinations of simultaneous button presses, or alternative keys such as the '3' and '9' keys on a touch pad, Page Up/Page Down, or others.

The buttons might be animated with an indication of the progression of time within the particular segment named by the button. This may take the form of a line or bar with a mark or coloration change that moves along or across the graphic to mark the relative position within the segment. Buttons may provide additional functionality, including pop-up menus for additional information or selections.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. In connection with a video display system capable of displaying a sequence of video segments, a method for displaying a plurality of control objects associated with said video segments on a display screen comprising the steps of:
   displaying a first control object, associated with the displayed first video segment, on the display screen in a focus position simultaneous with the display of a first video segment on the display screen;
   displaying a second control object, associated with a second video segment, adjacent to the focus position; and
   moving the second control object to the focus position, and the first control object out of the focus position, in substantial synchronicity with a transition between the display of the first video segment and the second video segment on the display screen.

2. The method of claim 1, further comprising the step of displaying a third control object adjacent to the focus position, whereby the focus position is interposed between the second control object and the third control object.

3. The method of claim 1, further comprising the steps of:
   scrolling among the plurality of control objects based on input from a user of the video display system;
   accepting the selection of one of the plurality of control objects based on input from a user of the video display system; and
   displaying a video segment associated with the selected control object.

4. The method of claim 1, further comprising displaying a focus frame within said focus position, said focus frame operative to supply a visual indication of user control of the first control object and moving said focus frame under user control to the second control object.

5. The method of claim 1, said first and second control objects including displayed therein visual annotation corresponding to the content of the video segments associated with said control objects.

6. The method of claim 2 wherein the first, second, and third objects correspond to current, future, and past segments respectively within a default video sequence.

7. The method of claim 6, further comprising the step of simultaneously moving the third object off of the display screen, and a fourth object onto the display screen simultaneous with the movement of the first object out of the focus position and the second object into the focus position so that the end position results in the focus position being interposed between the first control object and the fourth control object.

8. The method of claim 1, further comprising the step of displaying at the second control object a plurality of subobjects, each corresponding to a respective video segment, to provide a selectable branching pathway from the video segment associated with the first control object.

9. The method of claim 8, further comprising the step of, in the absence of input from a user of the video display system, moving the preselected one of the second control subobjects to the focus position, and the first control object out of the focus position, at the end of the display of the first video segment.

10. A system, comprising a video display system, for displaying a plurality of control objects simultaneous with associated video segments on a display screen, comprising:
    a first control object displayed in a focus position on said display screen simultaneous with an associated first video segment;
    a second control object, associated with a second video segment, displayed adjacent to said focus position on said display screen,
    wherein the second control object is moveable into the focus position, and the first control object out of the focus position, in substantial synchronicity with a transition between the display of the first video segment and the second video segment on the display sermon.

11. The system of claim 10, further comprising a third control object, associated with a third video segment, displayed adjacent to said focus position on said display screen, whereby the focus position is interposed between the second control object and the third control object.

12. The system of claim 11, wherein the plurality of control objects can be scrolled based on input from a user of the video display system and wherein one of the plurality of objects can be selected based on input from a user of the video control system to thereby cause the selected object to move to the focus position on the display screen in substantial synchronicity with a start of the display of the video segment associated with the selected object.

13. The system of claim 12, further comprising a focus frame moveable between the plurality of objects based on input from the user of the video display system.

14. The system of claim 10, said first and second control objects including displayed therein visual annotation corresponding to the content of the video segments associated with said control objects.

15. The system of claim 12 wherein the first, second, and third objects correspond to current, future, and past segments respectively within the video sequence.

16. The system of claim 10, further comprising a plurality of subobjects located in place of the second object, each corresponding to a respective video segment, to provide a selectable branching pathway from the video segment associated with the first control object.

17. The system of claim 16, wherein in the absence of input from a user of the video display system, moving the preselected one of the second control subobjects to the focus position, and the first control object out of the focus position, at the end of the display of the first video segment.

18. The system of claim 10, further comprising a video frame in which the video segments are displayed where said video frame is spaced from said focus position.

19. A computer-readable medium on which is stored a program for displaying a plurality of control objects on a display screen in connection with a video display system, the program comprising instructions which, when executed by the computer, perform the steps of:
    displaying a first control object, associated with the displayed first video segment, on the display screen in a focus position simultaneous with the display of a first video segment on the display screen;
    displaying a second control object, associated with a second video segment, adjacent to the focus position; and moving the second control object to the focus position, and the first control object out of the focus position, in substantial synchronicity with a transition between the display of the first video segment and the second video segment on the display screen.

20. The medium of claim 19, further comprising:
displaying a third control object, associated with a third video segment, adjacent to the focus position so that the focus position is interposed between the second and third control objects; and
moving the third object off of the display screen, and a fourth object onto the display screen simultaneous with the movement of the first object out of the focus position and the second object into the focus position so that the end position results in the focus position being interposed between the first control object and the fourth control object.

21. The medium of claim 20, further comprising displaying a video segment associated with the control object located in the focus position within a video frame on the display screen, wherein the video frame is non-overlapped with the focus position.

22. The medium of claim 20, further comprising displaying at the second control object a plurality of subobjects, each corresponding to a respective video segment, to provide a selectable branching pathway from the video segment associated with the first control object.

23. The medium of claim 22, further comprising the step of, in the absence of input from a user of the video display system, moving the preselected one of the second control subobjects to the focus position, and the first control object out of the focus position, at the end of the display of the first video segment.

* * * * *

UNITED STATES PATENT AND TRADEMARK OFFICE
CERTIFICATE OF CORRECTION

| | |
|---|---|
| PATENT NO. | : 8,176,425 B2 |
| APPLICATION NO. | : 10/066144 |
| DATED | : May 8, 2012 |
| INVENTOR(S) | : Michael W. Wallace et al. |

It is certified that error appears in the above-identified patent and that said Letters Patent is hereby corrected as shown below:

In the Specification

Column 3, Line 14 should read:
   on some modern set-top boxes) and video-on-demand sys- In the Claims Column 8, Line 20 should read:
   the second video segment on the display screen.

Signed and Sealed this
First Day of October, 2013

Teresa Stanek Rea
*Deputy Director of the United States Patent and Trademark Office*